United States Patent

Gibson, Jr.

[15] 3,679,824

[45] July 25, 1972

[54] FACSIMILE SYSTEM

[72] Inventor: Charles B. Gibson, Jr., Portland, Oreg.

[73] Assignee: Tektronix, Inc., Beaverton, Oreg.

[22] Filed: May 4, 1970

[21] Appl. No.: 34,176

[52] U.S. Cl. ................178/6.7 R, 178/DIG. 3, 178/DIG. 22, 178/6.6 A, 346/74 CR

[51] Int. Cl. ......................H04n 1/30, H04n 5/02, H04n 5/84

[58] Field of Search .................178/6.6 A, 6.7, 6.7 A, DIG. 3, 178/DIG. 22; 315/12; 346/74 CR

[56] References Cited

UNITED STATES PATENTS

| | | | |
|---|---|---|---|
| 3,414,668 | 12/1968 | Adams | 178/7.2 |
| 3,426,238 | 2/1969 | Gibson | 346/74 CR |
| 3,401,299 | 9/1968 | Crowell | 178/DIG. 3 |
| 3,084,213 | 4/1963 | Lemelson | 178/DIG. 22 |

*Primary Examiner*—Howard W. Britton

*Attorney*—Buckhorn, Blore, Klarquist and Sparkman

[57] ABSTRACT

A computer terminal includes a cathode ray storage tube for receiving information from a computer and storing the same for continuous viewing. A copying apparatus is employed for making a permanent copy of the information presented on the cathode ray storage tube screen, such copying apparatus including means for scanning a sensitized surface, later suitably developed to provide the permanent copy. Read out circuit means effects simultaneous scanning of the copying apparatus and the cathode ray storage tube at a relatively slow rate compatible with the scanning capability of the copying apparatus, while at the same time the cathode ray storage tube's electron beam is pulse modulated wherein each pulsation thereof has a duration shorter than necessary to write information on the storage tube. The resultant signal produced at the storage tube target is coupled to the copying apparatus to duplicate the information stored on the cathode ray storage tube screen.

13 Claims, 2 Drawing Figures

CHARLES B. GIBSON, JR
*INVENTOR*

BY
*BUCKHORN, BLORE, KLARQUIST & SPARKMAN*
*ATTORNEYS*

FACSIMILE SYSTEM

BACKGROUND OF THE INVENTION

A cathode ray storage tube apparatus is attractive for the output of computer information because of the rapid writing speed thereof as compared with mechanical devices, such as an *X-y* plotter or a teletypewriter. The computer output information may be rapidly written on the screen of the cathode ray storage tube where the information is then retained for viewing. Therefore, cathode ray tube presentations are advantageously utilized in computer terminal apparatus for communicating with the remote computer on a time shared basis over a telephone line.

The cathode ray storage tube presentation is semi-permanent in nature and advantageously requires no additional computer time for its maintenance. Usually, the presentation on the cathode ray tube screen is sufficient for providing the computer terminal operator with the desired information or answer from the computer. Important data may simply be written down by the operator. However, the option of additionally providing a permanent "hard copy" output of selected information is clearly desirable, e.g., in the case of graphic displays and the like. Of course, one may photograph the cathode ray tube presentation in order to provide a permanent copy thereof. However, this procedure is time consuming and unnecessarily expensive in most instances.

SUMMARY OF THE INVENTION

According to the present invention, a system for providing a copy of information stored on a cathode ray storage tube includes copying apparatus provided with scanning means operatively associated with a movable sensitive surface adapted to provide a permanent copy. Read out circuit means includes deflection signal generation circuitry supplying deflection signals for effecting scanning operation by the copying apparatus as well as for providing deflection signals to the cathode ray storage tube. The read out circuit means also pulse modulates the cathode ray storage tube electron beam with each pulsation having a duration less than necessary to write information on the storage tube. The resultant output produced at the cathode ray storage tube target is coupled to the copying apparatus in which the permanent copy is produced. This permanent copying operation does not affect the information stored on the cathode ray storage tube, and as many hard copies may be produced as desired.

It is an object of the present invention to provide an improved system for supplying a copy of electronically received and displayed information.

It is a further object of the present invention to provide an improved system for providing a permanent copy of information stored on a cathode ray storage tube.

It is a further object of the present invention to provide an improved system for supplying multiple copies of information stored on a cathode ray storage tube.

It is an additional object of the present invention to provide improved read out circuitry for operating a copying apparatus in conjunction with a cathode ray storage tube for producing copies of information stored and displayed on such storage tube.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 1 is a block diagram of a system according to the present invention for providing a permanent copy of electronically received information; and FIG. 2 is a plot of target secondary emissiOn ratio versus target potential for a cathode ray storage tube employed according to the present invention.

DETAILED DESCRIPTION

Figures 1, 2:
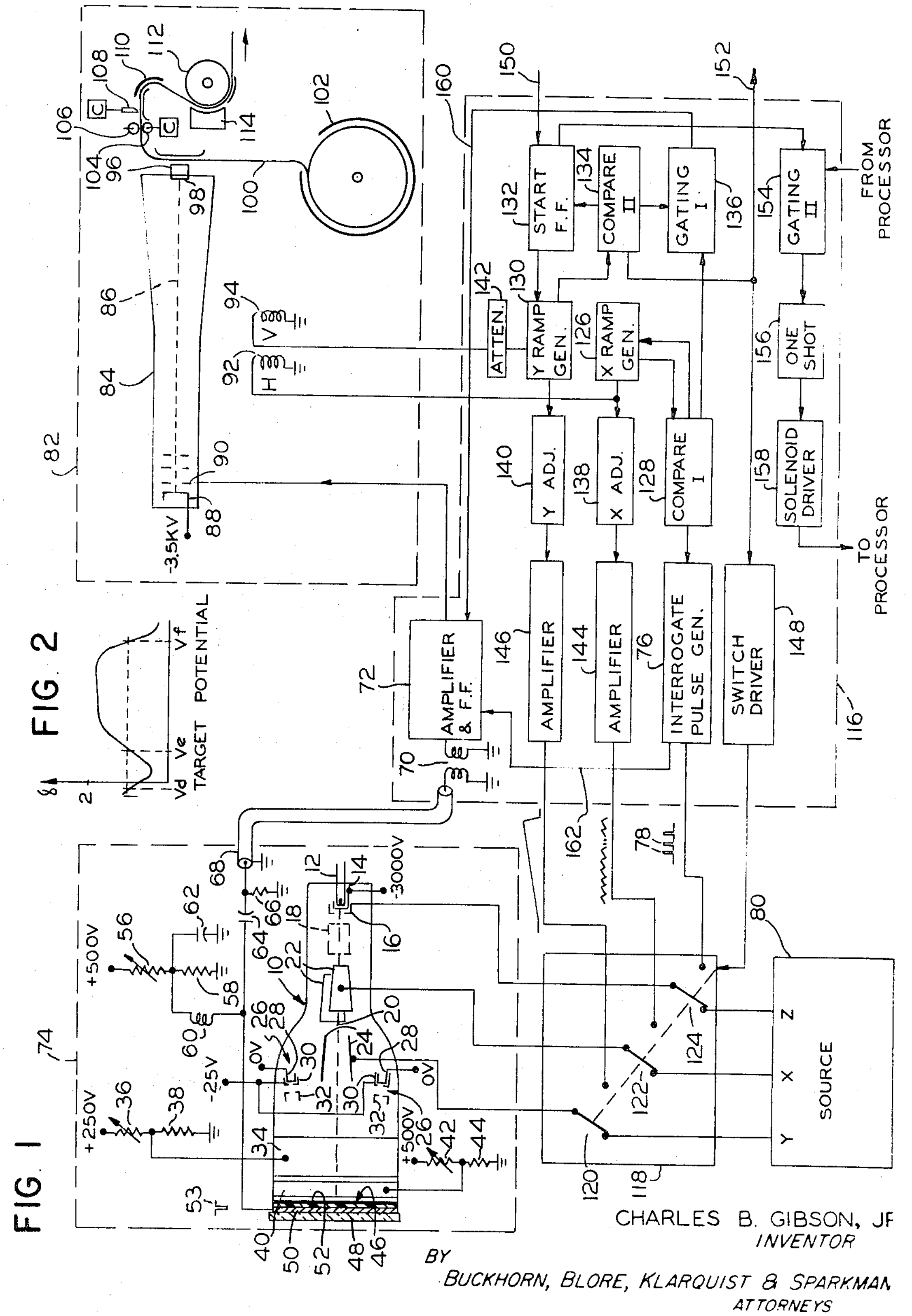

Referring to FIG. 1, a computer terminal comprises cathode ray storage tube apparatus 74 which includes a cathode ray storage tube envelope 10 formed of insulating material housing a principal electron gun including a filament 12, a cathOde 14 connected to a high negative voltage source, a control grid 16, and a focusing and accelerating structure 18. The electron beam 20 produced by the principal electron gun is deflected horizontally by means of horizontal deflection plates 22 and vertically by means of vertical deflection plates 24. The beam is directed toward a target 46 at the opposite end of the tube. The storage tube is additionally provided with one or more flood type electron guns 26 each having a cathode 28, a control grid 30, and an anode 32, and which are supported inside the envelope 10 adjacent the end of the vertical deflection plates 24 closest the target. Cathodes 28 are conveniently maintained at the zero volt level while grids 30 are suitably connected to a −25 volts. Electrons emitted from the flood guns diverge into a wide beam which is substantially uniformly distributed toward the target 46.

A plurality of electrodes are also provided on the inner surface of envelope 10 beyond the flood guns. A first electrode 34, connected to midpoint of a voltage divider comprising resistors 36 and 38 coupled between a +250 volts and ground, acts to provide a more uniform electric field to collimate electrons. A collector electrode 40 near the target end of the tube is connected at a midpoint of a voltage divider including resistors 42 and 44 coupled between a +500 volts and ground. This electrode can perform the additional function of collecting secondary electrons as will hereinafter become more evident.

Storage target 46 is disposed on the inner side of glass end plate 48 and includes a transparent signal plate 50 over which is disposed a dielectric 52, comprising an integral layer of P-1 type phosphor. Signal plate 50 is a thin transparent conductive coating such as tin oxide or the like and is coupled via inductance to the midpoint of a voltage divider comprising resistors 56 and 58 disposed between a +500 volts and ground. A capacitor 62 also shunts the midpoint to ground. The tube voltages are selected to result in a secondary emission characteristic for the tube as illustrated in FIG. 2 where secondary emission ratio is plotted against target potential.

Horizontal and vertical deflection signals are provided to horizontal and vertical plates 22 and 24 respectively as hereinafter described. Control grid 16 of the principal electron gun is connected via double throw switch 124, in switching meanS 118, alternatively to source 80 or an interrogate pulse generator 76. During storing operation, source 80 applies a Z signal voltage to grid 16 for writing information charges by means of beam 20 on storage target 46 through the process of secondary emission. Source 80 thus provides a Z output at the same time beam 20 scans over a selected area or target element where information is to be written and stored. The beam is deflected at this time by X and Y signals delivered from source 80 via switches 122 and 120 which are simultaneously operable with switch 124. Later, with switch 124 thrown to its right hand position, interrogate pulse generator 76 provides a series of short duration negative voltage pulses 78 employed for reading out information whereby an output is provided on signal plate 50. When these read out pulses are employed, information is neither written nor destroyed on the storage target 46, as hereinafter described.

During storing operation, the tube polarities are arranged such that beam 20 has a relatively high velocity for writing and is capable of producing secondary electrons when it strikes storage dielectric 52. Secondary electrons are then suitably collected by collector 40 in which case the potential of collector electrode 40 is suitably adjusted to be just slightly higher than the potential of signal plate 50. The storage dielectric 52 may alternatively have a sufficiently porous structure to enable secondary electrons emitted from the bombarded surface of dielectric 52 to be transmitted therethrough and be collected.

The production of secondary electrons from an elemental area of dielectric 52 on target 46 causes such area to become relatively positive. Such area is retained at a relatively positive potential after beam 20 is scanned past such elemental area because of the action of flood guns 26. Flood guns 26 prOduce relatively low velocity electrons which strike the target but which ordinarily have insufficient velocity for writing information thereon. When the electrons from flood gunS 26 strike areas of the target upon which a positive charge has not been written, these flood electrons tend to maintain such areas at the relatively negative potential of the flood gun, e.g., 0 volts. However, the flood gun electrons are attracted by positive elemental areas and obtain a high velocity with respect to these areas producing continued secondary emission therefrom such that these areas are maintained relatively positive or near the potential of signal plate 50 and collector electrode 40. The target thus has bistable properties and is capable of retaining information written thereon, with the flood beam of electrons driving target areas toward one of two stable potentials depending upon the information written thereon with beam 20.

Examining the secondary emission ratio versus target potential curve for the target acted on by the flood gun, which curve is illustrated in FIG. 2, we see three points at which the secondary emission ratio is equal to one. At $V_d$, $\delta$=1, because the target, and specifically the inside surface of dielectric 52, has collected sufficient electrons to charge a few tenths of a volt negative with respect to the flood gun cathode, thereby rejecting all electrons. At $V_e$, the accelerating potential is high enough for the material on the target dielectric surface to emit secondary electrons, and at $V_f$ the target dielectric surface has charged a few volts higher than the collector and all secondary electrons in excess of primary electrons are returned to the target. $V_d$ and $V_f$ are stable potentials. If the target begins to rise above $V_d$, the target collects electrons, the secondary emission being less than one, and the target dielectric charges negatively restoring the target dielectric to $V_d$. If we bombard the target with a high energy electron beam 20, and allow it to charge by secondary emission to any potential just under $V_e$, it will return under the action of the flood guns to $V_d$. However, it we allow it to charge more positively than $V_e$, due to the action of beam 20, the secondary emission caused by the flood electrons will charge the target dielectric positively until it reaches $V_f$, thus writing information. If it passes $V_f$, the secondary emission ratio becomes less than one and any electrons arriving tend to charge the target negatively. $V_e$ is described as the first crossover voltage of the secondary emission characteristic.

Now, if we wish to read out or interrogate information stored on the target, we may do so by means of the same electron beam 20 which has been employed to write information on the target, or, alternatively, we may use a separate but similar electron beam. As when writing information with such electron beam, secondary emission is produced at the target, and information in the form of positive charge tends to be written. Thus information defined by the absence of a positive charge would tend to be destroyed.

In accordance with the present apparatus, however, short reading pulses 78 are applied to the grid 16 of the principal electron gun causing short duration pulsation of the electron beam 20 and resulting in output pulses 53 from plate 50. The length of each pulsation is selected such that the area to which the beam is directed is not entirely changed from one potential to anOther. The negative area is not rendered positive because the pulsation is shorter than required to change the selected area from $V_d$ to $V_e$ as illustrated in the FIG. 2 curve. That is, the pulsation of the electron beam 20 is short enough so that the potential of the area being read out does not exceed the first crossover point, $V_e$ of the secondary emission characteristic of the flood beam. Therefore, the flood beam drives such area back toward its original stable potential in order to retain the stored information. Mathematically t is less than:

$$\frac{V_e C}{[i_p(1-\delta_1)+i_f(1-\delta_2)]} \qquad (1)$$

In this expression, $i_p$ = the high energy beam current, that is, the current of beam 20 during read out;
$i_f$ = the low energy flood beam current;
$\delta_1$ = secondary emission ratio for $i_p$ (greater than 1);
$\delta_2$ = secondary emission ratio for $i_f$ (less than 1);
$V_e$ = first secondary emission crossover;
$C$ = target element capacitance at the area being read out;
$t$ = time the high energy beam rests on the target element or area.

The time between pulsations of electron beam 20 is selected to be long enough for the target area read out to return to its original stable state, for example, from $V_e$ to $V_d$. In general this time, T, should be more than:

$$\frac{V_e C}{i_f(1-\delta_2)} \qquad (2)$$

This is the time required for the target element to return from $V_e$ to approximately zero ($V_d$ being only slightly less than zero). However, if the pulsation time was materially less than required to take the target to the crossover point $V_e$, then the actual voltage to which the target area being read out was changed should be substituted for a $V_e$ in the above expression.

In the above expressions it will be noted that $\delta_1$, and $\delta_2$ vary during the times $t$ and T, so the inequalities (1) and (2) are usually satisfied empirically. In the case of an exemplary target employed, if a charge is delivered to the target area which is less than approximately 10 pico-couloumbs, it will be less than will write on such target. This value may be different for different targets.

The read out obtained according to the present apparatus is in pulses which are uniform in amplitude, and with. The amplitude is dependent upon the current of beam 20, which is fixed, and the potential of the target. If we pulse electron beam 20 with a train of pulses with an on-time less than Expression (1) and off-time greater than Expression (2), this allows a stationary beam to interrogate the target area without writing or destroying information.

According to the present apparatus, a scan will also be applied to horizontal deflection plates 22 and vertical deflection plates 24 so that the entire target area is suitably read out. When the beam is moving, the off-time may be shortened and the on-time may be lengthened, but the foregoing inequalities (1) and (2) must still be satisfied. Extremely slow scannIng may be employed. The output signal is a pulse signal, and therefore, AC coupled amplifiers may be used throughout the system. The method and means for reading information from a storage tube, as thus far described, is also described and claimed in my U.S. Pat. No. 3,426,238, granted Feb. 4, 1969, entitled CHARGE IMAGE STORAGE METHOD AND APPARATUS. A storage tube and target of the type described above is set forth and claimed in Robert H. Anderson U.S. Pat. No. 3,293,473, granted Dec. 20, 1966, entitled THIN POROUS STORAGE PHOSPHOR LAYER.

According to the system of the present invention, the output signal at plate 50 is coupled via capacitor 64 to one end of the coaxial cable 68 having an input resistor 66 disposed thereacross. Cable 68 connects cathode ray storage tube apparatus 74 to read out circuit 116 where tranSformer 70 is interposed between the output end of cable 68 and an amplifier and flip flop circuit 72. The amplified and flip flop circuit 72 not only increases the amplitude of pulse signal 53, but the flip flop portion thereof sets with pulse 53. Thus, for each pulse 78 produced by interrogate pulse generator 76, an output pulse 53 will either be present or absent depending upon whether stored information appears at a particular element of the target toward which electron beam 20 is then directed. Immediately before the next pulse 78, the amplifier and flip flop circuit 72 is reset via lead 162 as hereinafter more fully described. Thus circuit 72 "stretches" the output pulses between interrogation pulses 78. The output of circuit 72 is applied to the control grid 90 of cathode ray tube 84 in processor 82, the latter comprising copying apparatus according to the present invention.

Cathode ray tube 84 is relatively flat in the vertical direction, with the narrow edge thereof appearing in the drawing. The tube 84 includes a cathode 88 from which electron beam 86 is emitted through grid 90, as well as conventional beam accelerating structure, not shown in detail. This particular tube is of the magnetically deflected variety having a deflection yoke including a horizontal deflection coil 92 and a vertical deflection coil 94, by means of which electron beam 86 is deflected in the horizontal and vertical directions respectively. The electron beam is directed toward an elongated narrow phosphor screen 98, having its long direction perpendicular to the drawing. The phosphor becomes illuminated in the usual manner when electron beam 86 impinges thereupon. Since the phosphor screen 98 is long and narrow, vertical deflection coil 94 is arranged to have but a slight effect, as compared with the deflection produced by horizontal deflection coil 92.

Phosphor 98 is disposed on the inside of a fiber optic faceplate 96 including a multiplicity of substantially parallel fiber optic strands arranged in a direction axial of cathode ray tube 84. The fiber optic faceplate 96 delivers the fluorescent image produced by phosphor 98 directly onto a sensitive web material 100, which in practice may be disposed substantially against fiber optic faceplate 96 for accurate exposure. In a particular embodiment according to the present invention, a permanent copy is provided by sensitive material 100 which here comprised 3M type 777 dry silver paper manufactured by Minnesota Mining and Manufacturing Company. During operation of the apparatus, this paper is drawn past faceplate 96 from the container 102 which stores a roll of such paper. The elongated dimension of faceplate 96 corresponds approximately to the width of paper web 100.

The paper web 100 is pulled past faceplate 96 by means of clutch operated rollers 104 and 106, at least one of which continuously turns for drawing the paper in the direction indicated by the arrow in FIG. 1. Thus, for example, roller 106 continuously turns in a counterclockwise direction, and roller 104 is operated upwardly by means of a clutch whereby paper 100 is frictionally engaged between the rollers and pulled to the right. The paper then proceeds under clutch operated cutter 108, and around guide 110 by which it is directed under continuously operating roller 112 between roller 112 and heating means 114. The sensitive paper hereinbefore designated as an example of the sensitive web material employed, is developed by raiSing the temperature thereof with means 114. Cutter 108 functions to sever the web into individual sheets of paper, each providing a reproduction of the stored image from image storage apparatus 74.

While the particular light sensitive and heat developed paper described above has been found to be of particular advantage in establishing a final permanent copy according to the present invention, it will be apparent that other recording media may be substituted therefor. The surface of means 100 receiving the image from cathode ray tube 84 may alternatively transfer an image received therefrom onto another web or sheet of material employed for the final copy.

Also, the cathode ray tube 84, in conjunction with the drive for moving web 100, comprises advantageous scanning means for the copying apparatus according to the present invention. However, again, other structures may be employed. For instance, the electron beam may be directly applied to a charge sensitive web, or a mechanical stylus means or the like can be used as a part for scanning means for tracing back and forth across a web material. In any case, the scanning back and forth across web 100, whether produced by electron beam 86 or other means, successively intercepts innumerable points or locations across the web which may record the presence, absence, or in some cases an intermediate amplitude of an input to the scanning means.

The operation of processor 82, as well as the operation of storage apparatus 74, is controlled by read out circuit 116, of which amplifier and flip flop circuit 72 forms a part. Circuit 116 also controls the switching of input signals to storage apparatus 74 by meanS of switching means 118 so that information for operating the cathode ray storage tube can selectively be derived from a source 80, or from read out circuit 116 itself. When switches 120, 122, and 124 in switching means 118 are thrown to the left, as indicated on the drawing, the X and Y deflection signals for the storage tube as well as the Z intensity information signal are applied respectively to the horizontal and vertical deflection plates, and to the control grid 16 of the storage tube. At that time, the storage tube is completely under the control of source 80, and may write and store information at comparatively rapid speeds for thus advantageously receiving information from a computer or the like.

Switches 120, 122, and 124 are under the control of switch driver 148, as indicated by the dashed line in switching means 118, whereby the switches may be simultaneously energized to the right. In practice, switching means 118 suitably comprises a plurality of relays as will be well understood by those skilled in the art. The operating time of switching means 118 will hereinafter be described. With the switches 122 and 124 in the right-hand position, the pulses 78 are suitable applied to control grid 16 for reading out the storage tube in a nondestructive manner as hereinbefore described. Also, the horizontal deflection plates 22 and vertical deflection plates 24 of the storage tube respectively receive their deflection signals from amplifiers 144 and 146. The signal thereby applied to the deflection plates cause electron beam 20 to scan the stored image on target 46 in a predetermined manner for the purpose of reading out the same and establishing a corresponding image on web 100.

Amplifier 144 receives its input from X ramp generator 126 via X adjusting circuit 138 employed for adjusting the amplitude, starting absolute value, etc. of a ramp signal provided by X ramp generator 126. Similarly, amplifier 146 receives its input from Y ramp generator 130 via Y adjusting circuit 140 which sets the amplitude, absolute voltage level, etc. of the Y ramp produced by Y ramp generator 130. In the present circuit, the X ramp generator substantially continuously produces a ramp signal which may be used for producing successive horizontal deflections across the face of the cathode ray storage tube in a conventional manner. Y ramp generator 130 provides a much slower ramp signal such that a multiplicity of X ramps occur during the period of one Y ramp applied to the vertical deflection plates. Thus, electron beam 20 is caused to execute a read out raster consisting of a large number of horizontal line traces across target 46, during the execution of one vertical trace. Typically, the fast ramp rate during read out was 3 to 8 milliseconds per horizontal trace, while the time for the vertical ramp to execute 1 cycle is a matter of seconds. Readout deflection of electron beam 20 is at a rate compatible with the operation of the processor, 82, e.g., the movement of web 100. Thus the vertical deflection in the storage tube may take place concurrently with mechanical movement of the web. The movement of beam 20 during read out can be viewed on the face of the cathode ray storage tube where it appears as a line disposed across the face of the storage tube which moves comparatively slowly in a direction orthogonal to its length, during the transport of web 100.

The X ramp from X ramp generator 126 is simultaneously applied during hard copy exposure to X deflection coil 92 of tube 84 whereby to cause deflection of electron beam 86 lengthwise of fiber optic faceplate 96 (i.e., in a direction perpendicular to the drawing), synchronized with similar horizontal deflection of electron beam 20.

The generation of a slow Y ramp in Y ramp generator 130 is started by a start flip flop 132 when the latter receives a voltage-level input on lead 150, as from a push button or the like, causing the flip flop to change from a first voltage state to a second voltage state. At this time, start flip flop 132 operates one-short multivibrator 156 through gating circuit II, indicated by reference numeral 154, and one-shot multivibrator 156. Multivibrator 156 in turn energizes solenoid driver 158 which controls clutch operating solenoids (not shown) in the processer. These solenoids in processor 82 move clutch operated roller 104 upwardly engaging paper web 100. Then, while the Y ramp generator executes its slow ramp, the paper 100 is moved in a vertical direction across fiber optic faceplate 96. The comparative speed of the paper drive and the duration of the Y ramp signal primarily affect the compression or expansion of the resultant image on web 100. The operation of the Y ramp and the movement of the web are roughly synchronized inasmuch as the Y ramp and the movement of the web are suitably initiated and take place at the same time.

The output of Y ramp generator 130 is further supplied to compare circuit II, indicated by reference numeral 134, wherein the Y ramp is compared with three voltage levels which we shall designate $T_1$, $T_2$, and $T_3$, indicative also of the successive times at which the ramp output from Y ramp generator 130 reaches these levels. The first level, $T_1$, is reached by the Y ramp a short time after initiation of the Y ramp signal, i.e., after a delay long enough for enabling the starting movement of web 100 after rollers 104 and 106 engage the same. When $T_1$ is reached, circuit 134 provides an output to switch driver 148 effective for operating switching means 118 and causing movement of switches 120, 122, and 124 to their right-hand positions. Thus, input 150 is effective for initiating the copying operation, including the connection of storage apparatus 74 to circuit 116 and processor 82 instead of to its input source 80. Only when the switches are closed to the right are the deflection outputs from circuit 116 applied to the deflection plates of the storage tube. During the same period, interrogation pulses 78 are applied to the storage tube apparatus.

At the same time as circuit 134 provides an output to switch driver 148, an output is also delivered on lead 152 as a "busy signal" indication for application to appropriate meanS so that the operator will be aware that the processer 82 is copying and the storage tube apparatus is not ready for another input from source 80.

When the Y ramp reaches a second level, $T_2$, arranged to be at a time relatively near the end of the Y ramp excursion, circuit 134 detects the level and operates switch driver 148 for returning switches 120, 122, and 124 to the left, whereby apparatus 74 may again receive information from source 80. The paper web 100 continues to move at this time so that a full record output will be available, with spacing between records. No substantial input will be received on grid 90 at this time. A short time later, e.g., a little over a second later, the Y ramp reaches a level, $T_3$, which is detected by compare circuit 134 and a signal is provided therefrom for changing the state of start flip flop 132. At this time, start flip flop 132 again closes one-shot multivibrator 156 to provide an output pulse delivered to the solenoid driver 158. This pulse operates solenoids (not shown) in processer 82 for declutching roller 104 and operating cutter 108. Roller 112 continues to turn for delivering a sheet of paper of predetermined length in the direction indicated by the arrow. As the paper is driven past the heating means 114, the image, theretofore received as light from fiber optic faceplate 96, is developed to produce a visible reproduction of the information stored by apparatus 74.

Substantially each time the start flip flop 132 changes states in a first direction, i.e., when an input is received at 150, the solenoid driver 158 causes roller 104 to engage the paper. Then, when start flip flop 132 is caused to assume its second state by compare circuit 134, roller 104 is declutched and cutter 108 is operated for severing the paper.

It should be noted that X ramp generator 126 provides an output to compare I circuit 128 and receives an output therefrom. Compare circuit 128 functions as a sweep length control circuit by setting the maximum amplitude of the ramp. As soon as the X ramp reaches a value set by compare circuit 128, compare circuit 128 resets the X ramp generator to produce another X ramp, and so on. During X ramp retrace periods, compare circuit 128 inhibits interrogate pulse generator 76 from producing interrogate pulses 78. Also, compare circuit 128 functions to blank amplifier and flip flop circuit 72 during horizontal retrace periods. This blanking signal is delivered on lead 160 through gating I circuit 136, which additionally causes blanking of amplifier and flip flop circuit 72 during the period between a level $T_2$ of the Y ramp and the next $T_1$. That is, amplifier and flip flop circuit 72 is blanked so that no input is provided at the control grid 90 unless and until the switches 120, 122, and 124 are actuated to the right.

Just before each interrogate pulse 78, generator 76 provides an output on lead 162 to amplifier and flip flop circuit 72 for resetting such circuit. The output of circuit 72 is thus a pulse stretched version of the pulse 53 produced in response to an interrogation of apparatus 74. The pulse is stretched until just before the next interrogation, so that, in the case of bistable storage, a given voltage level at control grid 90 is provided for most of the time stored information is detected by electron beam 20. Of course, control grid 90 will be deenergized when no recorded information is detected by beam 20.

Vertical scanning in processor 82 is actually accomplished by the movement of the paper web 100, with electron beam 86 executing a substantially horizontal trace and producing a corresponding horizontal line image of light at the front of fiber optic faceplate 96. The paper is pulled past this horizontal line of light during the time of the entire raster scan in apparatus 74, that is during the time period of the vertical electron beam scan in the cathode ray storage tube. However, for purposes of lengthening the operating life of cathode ray tube 84, an electronic vertical deflection in addition to the mechanical vertical deflection is provided in cathode ray tube 84. For this purpose, the Y ramp generator signal is applied to deflection coil 94 through attenuator circuit 142. The vertical deflection coil 94 produces a very small vertical deflection of the electron beam 86 on fiber optic faceplate 96, e.g., from the upper portion to the lower portion thereof as the paper 100 moves vertically past the fiber optic faceplate. This has very little effect upon the image produced, but lengthens the operating life of the tube since the horizontal line produced across phosphor 98 moves slightly, rather than being entirely stationary. Since the beam is deflected over a somewhat greater phosphor area, a given point in the phosphor will provide an adequate image for a longer lifetime.

Gating circuit 154 also receives a signal from processer 82. The inPut from processer 82 is merely indicative of whether processer 82 is pulling paper or not, and may be derived from a cam (not shown) in the processer. An incorrect signal from start flip flop 132 to one-short multivibrator 156 is inhibited by gating circuit 154, for instance, in a case where power is disconnected from the circuit while the processer is in the middle of a scanning operation, after which power is returned. The proper sequence of operation for the processer is thereby maintained. It is otherwise possible to pull paper in processer 82 for an unintended long period of time.

Considering operation of the entire FIG. 1 system, the cathode ray storage tube apparatus 74 is normally in a selective writinG mode under the control of source 80, wherein source 80 may comprise circuitry connecting apparatus 74 to a telephone line and/or a computer. The source is coupled to cathode ray storage tube apparatus 74 through switching means 118. The source 80 may also be coupled to apparatus 74 by other circuitry, (not shown), for effecting erasure of the storage tube and other functions.

After information is written and stored on the face of the cathode ray tube, the operator observing the image may desire a hard copy of the displayed image. He delivers a signal to start flip flop 132 via lead 150, as by closing a push button which applies a predetermined voltage level to lead 150. Start flip flop 132 then operates one-shot multivibrator 156 causing solenoid driver 158 to bring about clutching of roller 104 against the underside of paper web 100, thereby starting movement of the paper in a vertical direction across fiber optic faceplate 96 of tube 84. Start flip flop 132 also initiates operation of Y ramp generator 130 causing the latter to produce a slow Y ramp. When the Y ramp reaches a predetermined first voltage level $T_1$, compare II circuit 134 operates switch driver 148 for connecting cathode ray storage tube apparatus 74 to processer 116 instead of source 80. X ramp generator 126, which may be continuously running, now delivers X ramp deflection signals through switch 122 to horizontal deflection plates 22, and the Y ramp signal is delivered via switch 120 to vertical deflection plates 24, resulting in a raster sweep of electron beam 20. Furthermore, interrogate pulse generator 76, which May be continuously running, delivers pulses 78 through switch 124 to control grid 16. Each time stored information is detected by the sweeping electron beam 20 at the same time a pulse 78 occurs, an output 53 will be produced. This pulse occurs as a voltage across coil 60, with capacitor 62 holding the midpoint of voltage divider 56, 58 to a predetermined voltage level. The output pulse 53 sets amplifier and flip flop circuit 72 from a first state to a second state, and a stretched output is provided at control grid 90 of tube 84 in processer 82. Just before the occurrence of the next interrogation pulse 78, an output is provided on lead 162 which resets the amplifier and flip flop circuit 72.

The output of X ramp generator 126 is also applied to horizontal deflection coil 92 of tube 86 causing horizontal deflection of electron beam 86 in synchronism with the horizontal deflection of electron beam 20 for writing a horizontal line across faceplate 96. As paper web 100 moves past the faceplate, each horizontal line so written may expose a horizontal line on paper web 100, slightly displaced from the previous line. The lines "written" on paper web 100 form a latent image thereon inasmuch as this material is sensitive to the line of light provided at fiber optic faceplate 96. The image is developed as the paper web 100 subsequently moves past heating means 114. As the paper web moves, the electron beam 86 also moves very slightly to prevent continuous writing of a line at one horizontal location across phosphor screen 98.

When the Y ramp reaches a predetermined second level, fairly near the end of the Y ramp, compare II circuit 134 returns switches 120, 122, and 124 to the left. However, the paper web 100 is still moving at this time. At a slightly later time, compare II circuit 134 returns start flip flop 132 to its original state, and start flip flop 132 again operates one-shot multivibrator 156 causing solenoid driver 158 to declutch roller 104 and operate cutter 108. Continuously operating roller 112 delivers a copy to the person operating the equipment. The equipment is now returned to its original state, and the cathode ray storage tube apparatus 74 is again "on line" so that it may receive operation from a computer or the like.

Although horizontal and vertical deflection scanning in both cathode ray storage tube apparatus 74 and processor 82 are here indicated as being substantially synchronized or coordinated, it is appreciated that vertical and horizontal scanning as understood in the usual sense may be exchanged between the two equipments to provide an output appearing either "up and down" or "across" the final hard copy relative to the cathode ray storage tube displayed image.

While I have shown and described a preferred embodiment of my invention, it will be apparent to those skilled in the art that many other changes and modifications may be made without departing from my invention in its broader aspects. I therefore intend the appended claims to cover all such changes and modifications as fall within the true spirit and scope of my invention.

I claim:

1. A system for providing a copy of electronically received information comprising:

a cathode ray storage tube for receiving the electronically received information for storage, said tube including electron beam generation means and means for deflecting the electron beam of said storage tube over a storage surface thereof for storing the electronically received information, copying apparatus for selectively reproducing information on a surface adapted to provide a permanent copy, means for selectively initiating operation of said copying apparatus, deflection signal generation circuitry providing a scanning signal for operation of said deflection meanS of said cathode ray tube substantially concurrently with operation of said copying apparatus to produce scanning of said storage surface by said electron beam, means for reading out information as stored on said storage tube storage surface point by point as said scanning signal operates the deflection means thereof, and means for applying the output read out to said copying apparatus to reproduce, on said surface adapted to provide a permanent copy, the information as stored on said storage surface.

2. The system according to claim 1 wherein said copying apparatus comprises means for deflecting a second electron beam in a first direction in substantial synchronism with movement of the first mentioned electron beam in a given direction, and means for moving said surface adapted to provide a permanent copy in a second direction orthogonal to said first direction for subjecting said last mentioned surface to the effect of said second electron beam and providing a record of successive deflections thereof in said first direction, said second electron beam producing an image substantially across the surface adapted to provide a permanent copy, said image being narrow in the direction of movement of the last mentioned surface for producing incremental portions of the overall record which together provide a composite with movement of said last mentioned surface.

3. The system according to claim 1 wherein said storage tube comprises a bistable storage tube provided with a storage surface adapted to retain a stored image through continued secondary emission from said storage surface.

4. The system according to claim 3 wherein said means for reading out stored information includes means for pulsing said electron beam wherein each pulsation has a duration less than necessary to change a portion of said storage surface from one stable potential to another, with the spacing between pulsations allowing return of read out areas to their original stored potential level.

5. A system for providing a copy of electronically received information comprising:

a cathode ray storage tube for receiving the electronically received information for storage at a first rate, said tube including electron beam generation means and means for deflecting the electron beam of said storage tube over a storage surface thereof for storing the electronically received information, copying apparatus including scanning means for reproducing information on a surface which is sensitive for providing a permanent copy, deflection signal generation circuitry providing a scanning signal effective for bringing about scanning operation of said scanning means during copying apparatus operation, at a second and slower rate compatible with the scanning speed capability of said scanning means of said copying apparatus, means for also coupling said scanning signal from said generation circuitry to the deflecting means of the cathode ray storage tube during copying apparatus scanning operation for causing electron beam scanning of the information of said cathode ray storage tube at said second and slower rate whereby electron beam scanning in said cathode ray storage tube is then accomplished in substantial synchronism with scanning of said movable surface, means for modulating said electron beam during copying apparatus scanning operation, including means for pulsing the beam to read information from said cathode ray storage tube, wherein each pulsation thereof has a duration less than necessary to write information on said storage tube, means for coupling the output read from said storage tube to said copying apparatus, and means for synchronously initiating and concluding electron beam scanning operation in said cathode ray storage tube and operation of said scanning means in said read out apparatus for each permanent copy produced.

6. The system according to claim 5 wherein said storage tube comprises a bistable storage tube provided with a storage surface adapted to retain a stored image through continued secondary emission from said storage surface.

7. The system according to claim 5 wherein said copying apparatus comprises means for deflecting a second electron beam in a first direction in substantial synchronism with movement of the first mentioned electron beam in a given direction, and means for moving said surface adapted to provide a permanent copy in a second direction orthogonal to said first direction for subjecting said last mentioned surface to the effect of said second electron beam and providing a record of successive deflections thereof in said first direction, said second electron beam producing an image substantially across the surface adapted to provide a permanent copy, said image being narrow in the direction of movement of the last mentioned surface for producing incremental portions of the overall record which together provide a composite with movement of said last mentioned surface.

8. Read out circuit means in a system for providing a copy of information stored on a cathode ray storage tube, said system including copying apparatus for reproducing information on a surface adapted to provide a permanent copy, said read out circuit means comprising:

deflection signal generation circuitry providing a scanning signal for operation of deflection means of said cathode ray tube substantially concurrently with operation of said copying apparatus for reproducing information on a surface, for causing electron beam scanning of the information stored by said cathode ray storage tube, means for providing a pulse signal for modulating the electron beam of the cathode ray storage tube during copying apparatus operation wherein each pulsation thereof has a duration less than necessary to write information on said storage tube, and means for amplifying and coupling the output read from said storage tube to said copying apparatus.

9. The apparatus according to claim 8 further including means for simultaneously initiating electron beam scanning in said cathode ray storage tube and a scanning operation of said copying apparatus, said scanning operation producing an image substantially across said surface adapted to provide a permanent copy, and means for moving the last mentioned surface, said image being narrow in the direction of movement of the last mentioned surface for producing incremental portions of the overall information which together provide a composite with movement of said last mentioned surface.

10. Read out circuit means in a system for providing a copy of information stored on a cathode ray storage tube at a first rate, said system including copying apparatus with scanning means for reproducing information on a surface adapted to provide a permanent copy, said read out circuit means comprising:

deflection signal generation circuitry providing a scanning signal effective for bringing about scanning operation of said scanning means during copying apparatus operation, at a second and slower rate compatible with the scanning speed capability of said scanning means of said copying apparatus, means for also coupling said scanning signal from said generation circuitry to the deflecting means of the cathode ray storage tube during copying apparatus scanning operation for causing electron beam scanning of the information of said cathode ray storage tube at said second and slower rate whereby electron beam scanning in said cathode ray storage tube is then accomplished in substantial synchronism with scanning of said movable surface, means for modulating said electron beam during copying apparatus scanning operation, including means for pulsing the beam to read information from said cathode ray storage tube, wherein each pulsation thereof has a duration less than necessary to write information on said storage tube, and means for amplifying and coupling the output read from said storage tube to said copying apparatus.

11. The method of producing a permanent copy of information stored on a cathode ray storage tube comprising:

deflecting the electron beam of said cathode ray storage tube over a storage surface thereof in first and second directions, pulse modulating the electron beam of said cathode ray storage tube with a pulse duration less than necessary to write information on said storage tube, moving a sensitive image receiving surface in a first direction corresponding to a first direction of deflection in said storage tube, while scanning said surface in a second direction corresponding to said second direction of deflection in said storage tube, and coupling the storage tube output, derived from said storage tube in response to pulse modulation of said electron beam, for controlling the scanning intensity of said surface for providing an image on said surface corresponding point by point to an image stored by said storage tube, the scanning of said image receiving surface producing an image substantially across said image receiving surface which is narrower in the direction of movement of said image receiving surface for producing successive incremental portions of the complete image which together provide a composite with movement of the image receiving surface.

12. Apparatus for providing a representation of electronically received information comprising:

a cathode ray storage tube for receiving said electronically received information for storage at a first rate, the cathode ray storage tube including electron beam generation means and means for deflecting the electron beam over a storage surface thereof in first and second directions for storing the electronically received information, copying apparatus adapted selectively to provide a permanent copy of information stored by the storage tube, the copying apparatus including scanning means adapted for scanning in a given direction over and successively intercepting points on an image receiving surface which is sensitive to such interception to provide a permanent copy in response thereto, means for selectively initiating operation of the copying apparatus, deflection signal generation circuitry providing a scanning signal effective for bringing about scanning operation of the copying apparatus scanning means during copying apparatus operation, means for also coupling the scanning signal from the deflection signal generation circuitry to the deflecting means of the cathode ray storage tube during copying apparatus operation for causing electron beam scanning of the information stored by the cathode ray storage tube in the first direction in substantial synchronism with the scanning in the given direction of the image receiving surface, means for reading out stored information from the cathode ray storage tube storage surface point by point as the scanning signal operates the deflection means thereof, and means for applying the output read out from the cathode ray tube storage surface to the copying apparatus to control the scanning means point by point on the image receiving surface for providing an image on such surface corresponding to the information stored by the storage tube.

13. The apparatus according to claim 12 wherein the scanning signal provided by the deflection signal generation circuitry is effective for bringing about scanning operation at a second and slower rate compatible with scanning speed capacilities of the copying apparatus, the electron beam of the cathode ray storage tube operating in said first direction in substantial synchronism therewith during copying apparatus operation.

* * * * *